United States Patent
Chaudhuri et al.

(10) Patent No.: US 7,149,735 B2
(45) Date of Patent: Dec. 12, 2006

(54) STRING PREDICATE SELECTIVITY ESTIMATION

(75) Inventors: Surajit Chaudhuri, Redmond, WA (US); Venkatesh Ganti, Redmond, WA (US); Luis Gravano, New York, NY (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 10/603,035

(22) Filed: Jun. 24, 2003

(65) Prior Publication Data

US 2004/0267713 A1    Dec. 30, 2004

(51) Int. Cl.
  *G06F 17/30* (2006.01)
(52) U.S. Cl. ......................................... 707/6
(58) Field of Classification Search .............. 707/1–10, 707/100–104.1, 200–206
See application file for complete search history.

(56) References Cited

U.S. PATENT DOCUMENTS

| | | | | |
|---|---|---|---|---|
| 6,738,755 | B1 * | 5/2004 | Freytag et al. | 707/2 |
| 6,738,762 | B1 * | 5/2004 | Chen et al. | 707/3 |
| 6,865,567 | B1 * | 3/2005 | Oommen et al. | 707/2 |

OTHER PUBLICATIONS

H.V. Jagadish et al., Multi-dimensional substring selectivity estimation, Proc. of 25th VLDB Conference—ACM, 1999, pp. 387-398.*

A. Aboulnaga, A. R. Alameldeen and Jeffrey F. Naughton. *Estimating the Selectivity of XML Path Expressions for Internet Scale Applications*. In the 27th International Conference on Very Large Data Bases, pp. 591-600, 2001.

Z. Chen, F. Korn, N. Koudas and S. Muthukrishnan. *Selectivity estimation for Boolean queries*. In Proceedings of the Nineteenth ACM SIGMOD-SIGACT-SIGART Symposium on Principles of Database Systems. May 15-17, 2000. Dallas, TX, USA, pp. 216-225. ACM, 2000.

Y. Ioannidis and V. Poosala. *Balancing Histogram Optimality and Practicality for Query Result Size Estimation*, In *Proceedings of the 1995 ACM SIGMOD Int'l Conference on Management of Data*, San Jose, CA. May 22-25, 1995, pp. 233-244 ACM Press, 1995.

H.V. Jagadish, O. Kapitskaia, R. T. Ng and D. Srivastava. *Multi-Dimensional Substring Selectivity Estimation. Proceedings of 25th Int'l Conference on Very Large Data Bases*, Sep. 7-10, 1999, Edinburgh, Scotland, UK, pp. 387-398. Morgan Kaufmann, 1999.

H.V. Jagadish, R.T. Ng and D. Srivastava. *Substring Selectivity Estimation. In Proceedings of the Eighteenth ACM SIGACT-SIGMOD-SIGART Symposium on Principles of Database Systems*, May 31-Jun. 2, 1999, Philadelphia, Pennsylvania, pp. 249-260. ACM Press 1999.

(Continued)

Primary Examiner—Diane D. Mizrahi
(74) Attorney, Agent, or Firm—Microsoft Corporation (57) ABSTRACT

A method of estimating selectivity of a given string predicate in a database query. In the method selectivities of substrings of various substring lengths are estimated. For example, the selectivity of substrings between length 1 (or some constant q) to the length of the given string predicate may be estimated. The method then selects a candidate sub string for each sub string length based on estimated selectivities of the substrings. The estimated selectivities of the candidate substrings are combined. The combined estimated selectivity of the candidate substrings is returned as the estimated selectivity of the given string predicate.

46 Claims, 4 Drawing Sheets

OTHER PUBLICATIONS

P. Krishnan, J.S. Scott Vitter and B. Iyer. *Estimation Alphanumeric Selectivity in the Presence of Wildcards*. In *Proceedings of the 1996 ACM SIGMOD International Conference on Management of Data*, Montreal, Quebec, Canada, Jun. 4-6, 1996, pp. 282-293. ACM Press, 1996.

Wei-Yin Loh *Generalized, Unbiased, Interaction Detection and Estimation*. 2 pages, www.stat.wise.edu/~loh/guide.html.

L. Lim, M. Wang, S. Padmanabhan, J. Vitter and R. Parr. *XpathLearner: An On-Line Self-Tuning Markov Histogram for XML Path Selectivity Estimation*. In *Proceedings of the 28th Int'l Conference on Very Large Database (VLDB)*, 12 pages, Hong Kong, Aug. 20-23, 2002.

Wei-Yin Loh. *Regression Trees with Unbiased Variable Selection and Interaction Detection*. Statistica Sinica (2002) vol. 12, pp. 361-386.

\* cited by examiner

STRING PREDICATE SELECTIVITY ESTIMATION

FIELD OF THE INVENTION

The present disclosure concerns selectivity estimation of predicates, and more particularly, the present disclosure relates to a technique of estimating the selectivity of string predicates.

BACKGROUND ART

Relational database queries often include equality or LIKE selection predicates over string attributes. Existing techniques for estimating selectivities of string predicates are biased towards underestimating selectivities. String-valued data has become commonplace in relational databases as have complex queries with selection predicates over string attributes. An example of a selection predicate over a string attribute is Author.name like % ullman %. Query optimizers rely heavily on estimates of the selectivity of query predicates. As a result, selectivity estimation of string predicates has been used to define query execution plans.

One common class of string predicates is called wildcard predicates. Wildcard predicates are of the form R.A like % s %, where A is a string-valued attribute of a relation R. Techniques have been proposed for estimating the selectivity of wildcard predicates. Some prior techniques build summary structures, such as pruned suffix trees or Markov tables. These summary structures record the frequency of selected strings. The frequency of a string in a relation attribute is the number of attribute values that include the string. The set of string-frequency pairs retained varies with the summary structure. At run time, one existing technique for estimating the selectivity of a string predicate R.A like % s % involves two parts:

(i) parsing the query string s into possibly overlapping substrings $s_1, \ldots, s_k$ whose frequencies can be looked up in the summary structure, and (ii) combining the selectivities of the overlapping substring predicates to estimate the selectivity of the original query predicate.

To combine the selectivity of the substring predicates, existing techniques mainly rely either on an independence assumption or on a Markov assumption. The independence assumption assumes that the selectivity of a string predicate R.A like % $s_i$ % is independent of that associated with $s_j$, for all j≠i. The Markov assumption assumes that the selectivity of a string predicate R.A like % $s_i$ % depends only on that of R.A like % $s_{i-1}$ %.

The paper Krishnan et al., *Estimating alphanumeric selectivity in the presence of wildcards*, Proc. 1996 ACM SIGMOD Intl. Conf. on Management of Data, pp 282–293, 1996 (herein "Krishnan paper") discloses one approach to estimating selectivity. The Krishnan paper discloses the use of suffix trees for summarizing string values in a column. For a given relational attribute, a suffix tree is built to maintain frequencies of all suffixes of attribute values. The suffix tree is pruned so that it fits in the allocated amount of space. The pruned suffix tree retains only the most frequent substrings of attribute values. For estimating the frequency of a query string s, the Krishnan paper discloses dividing a given substring s into disjoint strings $s_1, \ldots, s_k$ such that each substring $s_i$ occurs in the suffix tree. The Krishnan paper assumes that an attribute value containing $s_i$ as a substring is independent of the attribute value containing some other substring $s_j$. The estimated selectivity of the initial string is the product of the selectivities of the $s_1, \ldots, s_k$ substrings. The Krishnan paper considers weighted combinations of estimates of suffixes, where the weight of an estimate is proportional to a suffix's length.

The paper Jagadish et al., *Substring selectivity estimation*, Proc. of the 18th ACM SIGACT-SIGMOD-SIGART Symposium on Principals of Database Systems, pp. 249–260, 1999. (herein "Jagadish *substring selectivity estimation* paper") discloses relaxing the independence assumption relied upon in the Krishnan paper. The Jagadish *substring selectivity estimation* paper relies on the Markovian "short memory" assumption. According to Markovian assumption, the probability of an attribute value v containing a substring $s_{i+1}$ only depends on attribute values v containing substring $s_i$ and not on the earlier substrings. Furthermore, the Jagadish *substring selectivity estimation* paper allows adjacent substrings to overlap.

The paper Jagadish et al., *Multi-dimensional substring selectivity estimation*, Proc. of the 25th Intl. Conf. on Very Large Data Bases, pp. 387–398, 1999 discloses adapting the methods disclosed in the Krishnan paper and the *substring selectivity estimation paper* to multi-attribute string predicate estimation by constructing one suffix tree per attribute. The paper Chen et al., *Selectivity estimation for Boolean queries*, Proc. of the 19th ACM SIGMOD-SIGACT-SIGART Symposium on Principles of Database Systems, pp 216–225, 2000 (herein "Chen paper") discloses estimating selectivities of Boolean queries involving string predicates potentially over multiple attributes. The Chen paper also enhances the pruned suffix trees by maintaining summary vectors with each node. The summary vector of a node represents a "signature" of all tuples with the node's associated string as a substring. These summary vectors can be used to combine selectivity estimates of individual terms in a Boolean query predicate.

The paper Aboulnaga et al., *Estimating the Selectivity of XML path expressions for internet scale applications*, Proc. of the 27th International Conference on Very Large Data Bases, pp. 591–600, 2001 (herein "the Aboulnaga paper") discloses using Markov tables over XML tag sequences as the summary structure for the problem of estimating the selectivity of simple XML path expressions consisting of XML tags. A Markov table of XML tags for an XML data set records the selectivity of all possible sequences of tags of length not exceeding a pre-specified constant q. The value of the constant q determines the amount of space required to store the Markov table. The Aboulnaga paper also proposes techniques for pruning the Markov tables so that they do not require more than some given amount of space. The paper Lim et al., *An on-line self tuning Markov histogram for XML path selectivity estimation*, Proc. of the 28th International Conference on Very Large Data Bases, pp. 442–453, 2002 discloses improving the pruning of the Markov tables by retaining the selectivity of substrings that are frequently used in a representative workload.

There is a need for a selectivity estimation technique that overcomes the underestimation problem associated with existing selectivity estimation techniques.

SUMMARY

The present disclosure concerns a method of estimating selectivity of a given string predicate in a database query. In the method selectivities of substrings of various substring lengths are estimated. For example, the selectivity of substrings between length 1 (or some constant q) and the length of the given string predicate may be estimated. The method then selects a candidate substring for each substring length based on estimated selectivities of the substrings. The estimated selectivities of the candidate substrings are combined. The combined estimated selectivity of the candidate substrings is returned as the estimated selectivity of the given string predicate.

In one embodiment, selectivity information for the database is stored in a summary structure. The selectivity information stored in the summary structure is used to estimate the selectivities of the substrings of various lengths. One summary structure that may be used is referred to as a q-gram table. A q-gram table is constructed for substrings of a given maximum length. A q-gram table stores the substrings in selected attribute fields a database up to the given maximum length q and the selectivity of each stored substring. In one embodiment, a markov estimator uses the selectivity information of the summary structure to estimate the selectivities of the substrings of various substring lengths.

In one embodiment, a candidate substring is the substring with a lowest actual or estimated selectivity at each length. When a q-gram table is the summary structure, the actual selectivity can be calculated for the substrings that have lengths less than or equal to the maximum length q.

In one embodiment, characteristics of string values and/or a workload of queries are used to combine the estimated selectivities of the candidate substrings. The characteristics and workload information is used to learn a function for assigning weights to each length of candidate substring. In one embodiment, actual selectivities of substrings of queries from an expected workload are calculated as are estimated selectivities of the substrings of the queries from the expected workload. The actual selectivities and the estimated selectivities of the substrings from the workload queries are used to learn a function for assigning weights used to combine the candidate substrings. In one embodiment, regression trees are used to assign weights for each substring length to combine the candidate substrings.

These and other objects, advantages, and features of an exemplary embodiment are described in conjunction with the accompanying drawings.

DETAILED DESCRIPTION

Exemplary Operating Environment

Figure 1:
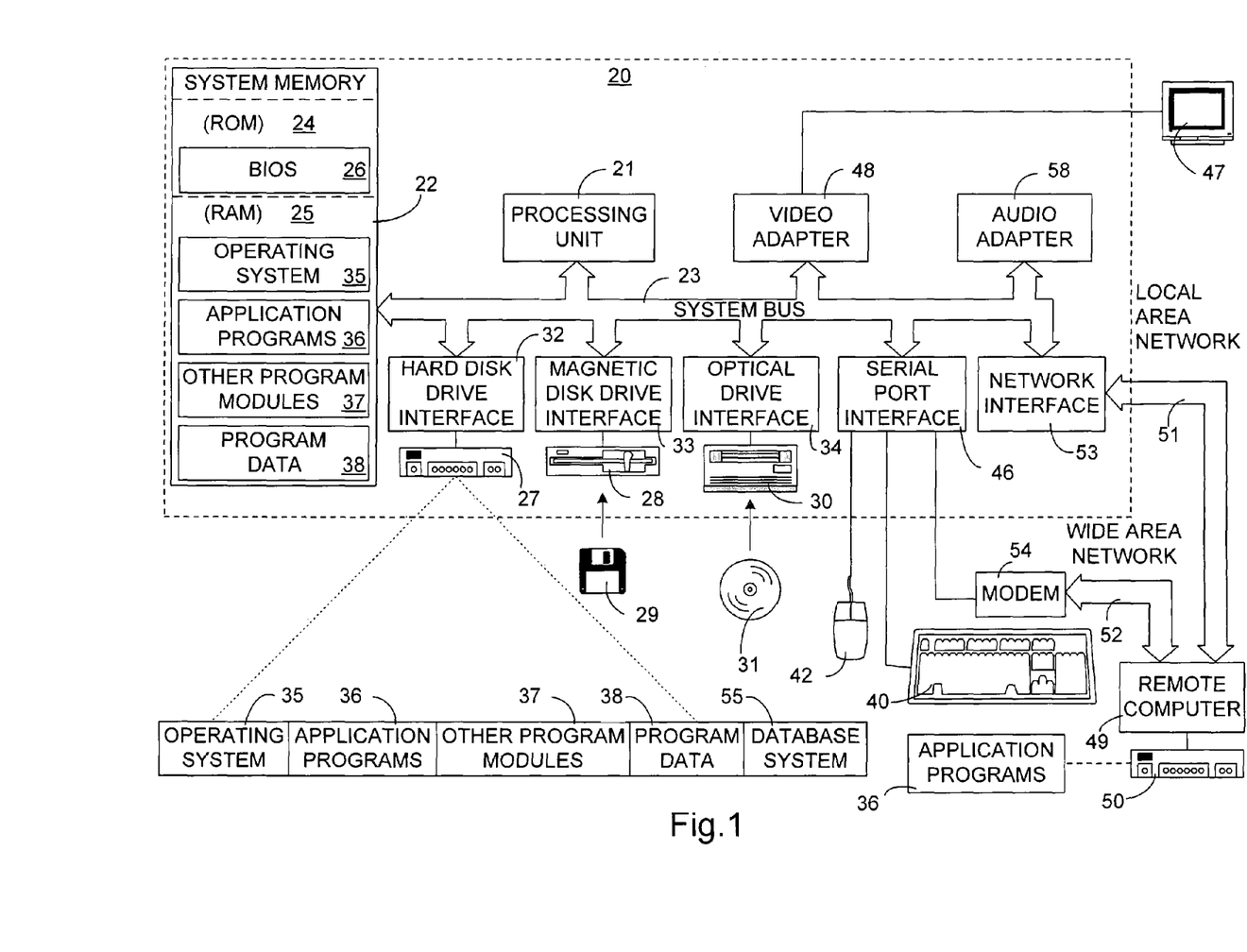
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Overview of Approach for Overcoming the Underestimation Problem

The independence and Markov assumptions may not be accurate in many real scenarios where the selectivity associated with a string is close to that of some of its substrings. In other words, these assumptions lead to poor selectivity estimates for a predicate R.A like % s % if the real selectivity is close to the selectivity of R.A like % s' % for a strict substring s' of s. For example, the selectivity of the substring predicate R.A like % eatt % may be almost the same as the selectivity of R.A like % seattle %. In this example, estimators based on the independence or Markov assumptions may severely underestimate the true selectivity of the seattle predicate. The existing estimators based on the independence or Markov assumptions over-compensate for the additional characters not in "eatt" (i.e. "s" and "le") and thus return a small fraction of the selectivity of R.A like % eatt %. These existing techniques would typically multiply the estimated selectivity of "eatt" by the selectivity of the additional characters and therefore underestimate the selectivity of "seattle."

This disclosure develops a short identifying substring hypothesis that is used in the method to estimate selectivity. In the short identifying substring hypothesis a query string s usually has a "short" substring s' such that if an attribute value contains s'" then the attribute value almost always contains s as well.

Figure 2:
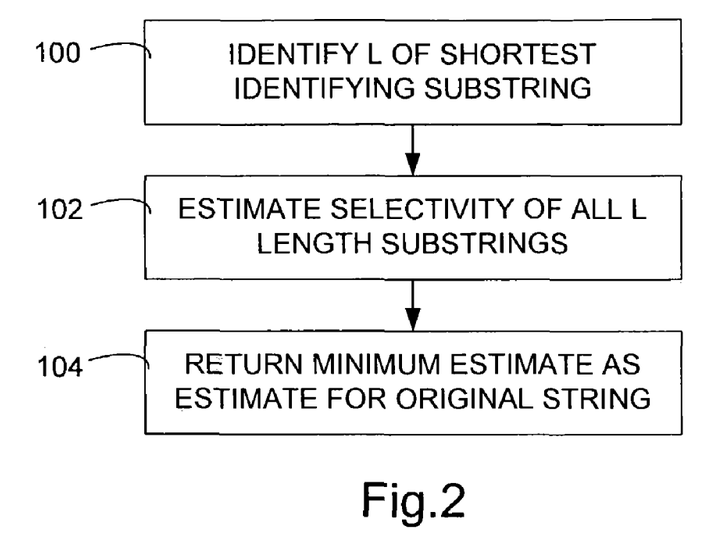
FIG. 2 is a flow chart that illustrates a method of estimating selectivity of a string predicate when a length of a shortest identifying substring can be found.

If a "minimal" identifying substring s' of a query string s could be identified, good quality selectivity estimates could be produced for the query predicate involving s by instead estimating the selectivity of a substring s'. For example, existing estimators (e.g., a Markov estimator) could be used to return the selectivity estimate for R.A like % eatt % as the selectivity of the original predicate R.A like % seattle %. This strategy would help overcome the underestimation problem of conventional estimators by focusing on a shorter substring with close to the same frequency as the original, longer query string. One step in this strategy is to accurately identify the shortest identifying substring, which is a challenging task if only limited statistics are available. Referring to FIG. 2, the method assumes that the length L of the shortest identifying substring could be identified 100 in one embodiment. In this case, the method could simply estimate 102 the selectivity of all substrings of length L and return 104 the minimum estimate as the selectivity estimate for the original predicate, exploiting the fact that the selectivity of a string cannot be larger than that of any of its substrings.

Figure 3:
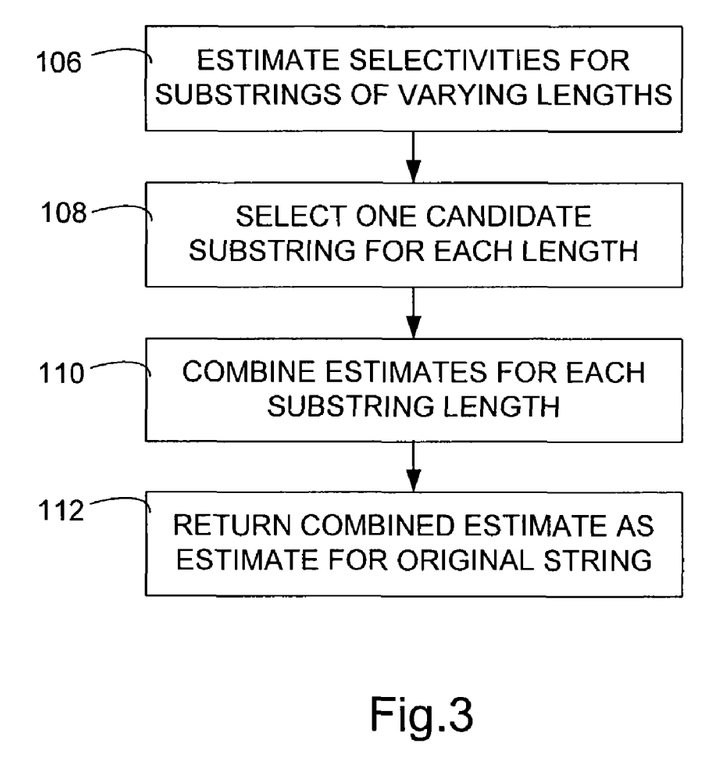
FIG. 3 is a flow chart that illustrates a method for estimating the selectivity of a string predicate.

However, length L of the shortest identifying substring is not generally known when only limited frequency statistics are available. Referring to FIG. 3, the selectivities of substrings of varying predetermined lengths are estimated 106. The method identifies multiple candidate identifying substrings of a given string s. One candidate substring of each possible length between 1 (or constant q defined below) and the length |s| of the given string is selected. The estimates of the candidate substrings are then combined 110. The combined estimates are returned 112 as the selectivity estimate for the given string s.

In the exemplary embodiment, the disclosed method adapts to characteristics of string values in the relation and/or in a query to combine substring selectivity estimates. If substrings of an attribute value in a given relation vary drastically across tuples, then the selectivity of a string predicate over this attribute is likely to closely correlate with some of its associated substrings. For example, queries that involve key words of paper titles over the column consisting of all paper titles in a database of technical papers are likely to closely correlate with some substrings of the paper titles. In contrast, if string values from different tuples share all but the last few characters, then the selectivity correlation will tend to be weaker. Queries over a column consisting of all part identifiers within an enumerable range could be such an example. To adapt to variability in correlations, which might even be observed within a single data set, the disclosed method exploits query workloads to learn an appropriate combination model for the selectivity estimates of candidate identifying substrings over a particular database. The model is then applied at run time to estimate the string predicate selectivity.

Figure 4:
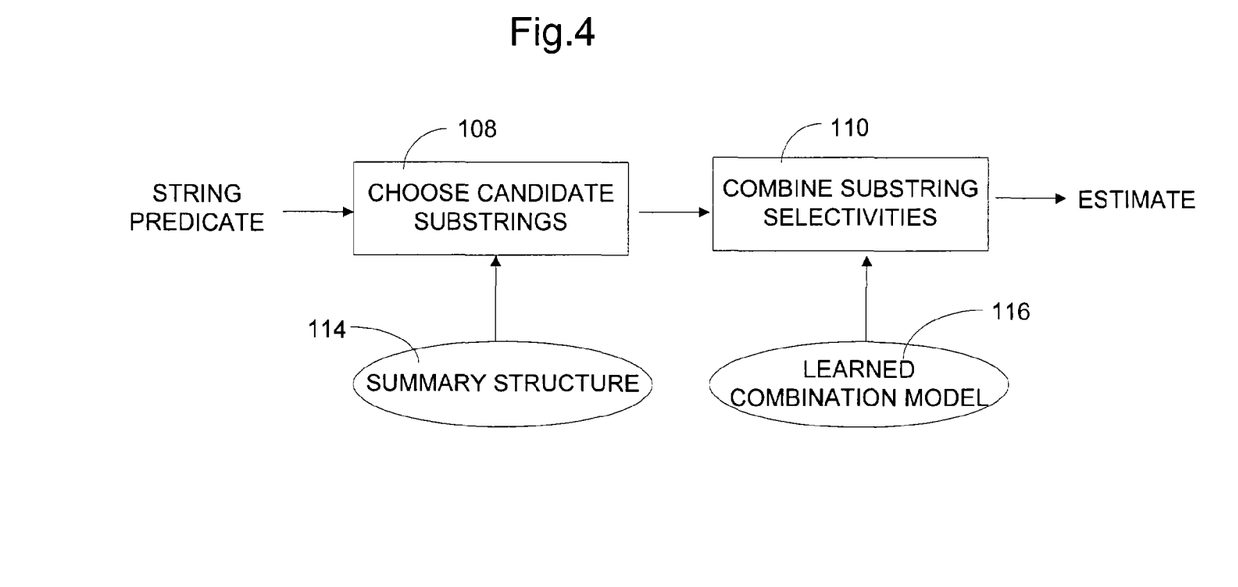
FIG. 4 is a schematic illustration of a general framework for estimating the selectivity of a string predicate.

FIG. 4 illustrates the disclosed method's general estimation framework. The choice of summary structure 114 and learned combination model 116 is largely orthogonal to that of the combination framework. The summary structure is used to choose 108 candidate substrings. The learned combination model 116 is used to combine 110 the selectivities of the candidate substrings. In the disclosed embodiments, Markov tables and regression tree models are used as the summary structure and learning model respectively. It should be readily apparent that other summary structure and learning models could be used without departing from the spirit and scope of the present invention.

Notation Used in Disclosure

In this disclosure R.A is used to denote the attribute A in a relation R. t[A] is used to denote the value in attribute R.A, of a tuple t. $\Sigma$ is a finite alphabet of size $|\Sigma|$ such that values in the attribute R.A are drawn from $\Sigma$. The symbol '%' not in $\Sigma$ denotes a wildcard character, which is used for specifying predicates. s in $\Sigma$ is a string of length |s|. In this disclosure, s denotes a query string.

In this disclosure, the following notation is used for extended strings. # and $ are two symbols not in the alphabet Σ. Given a string s, the extended string ext(s) is obtained by prefixing s with # and suffixing it with $ For example, ext("seattle")="#seattle$.

In this disclosure, the following notation is used for unit predicates. A predicate of the form "R.A like [%]s[%] " where s does not contain the wildcard character % is called a unit predicate. The presence of wildcard characters at the beginning and at the end of the predicate is optional (signified by enclosure within square brackets). A unit predicate whose first character is not the wildcard character is called a prefix predicate. That is, the predicate requires the query string to be at the beginning of an attribute value. A unit predicate whose last character is not the wildcard character is called a suffix predicate. That is, the predicate requires the query string to be at the end of an attribute value.

To simplify the handling of prefix and suffix predicates, the disclosed method conceptually replaces each attribute value v in R.A with its extended string ext(v)="#v$". Then, the disclosed method regards a prefix predicate "R.A like s %" as equivalent to predicate R.A like %#s %", and a suffix predicate "R.A like % s" as equivalent to "R.A like % s$ %". The remainder of this disclosure assumes that all attribute values in R.A are replaced with their extensions, and that we transform prefix and suffix predicates as disclosed above. This disclosure may refer to a predicate "R.A like % s %" simply as "% s %" whenever the attribute R.A is clear from the context or unimportant for the discussion.

In this disclosure, the following notation is used for predicate matching. A tuple t is said to satisfy or match a unit predicate "R.A like % s %" if s is a substring of t[A].

In this disclosure, the following notation is used for frequency: The frequency f(p) of a unit predicate p is the number of tuples in relation R that match p. The selectivity of predicate p is equal to f(p)/|R|. The frequency f(s) of a string s over an attribute R.A as equivalent to f("R.A like % s %"). The selectivity of a string s is defined as the selectivity of "R.A like % s % and the selectivity of a string s as the selectivity of % s %.

In this disclosure, the following notation is used for Q-gram tables. q is a positive integer. Any string of length q in $(\Sigma \cup \{\$,\#\})^*$ is called a q-gram. A q-gram table $QT_q$ (R.A) for attribute R.A is a lookup table with the frequency $f(s_n)$ over R.A of each n-gram $s_n$ where $1 \leq n \leq q$. That is, the q-gram table consists of the frequency of all n grams of length q or less.

In this disclosure, the following notation is used for Q-gram sequences: The q-gram sequence $Q_q(s)$ of a string s with no wildcards is the ordered sequence of all (overlapping) q-grams that are substrings of s. For example, $Q_3$("seattle") is [sea, eat, att, ttl, tle].

Use of Existing Estimation Techniques

In the exemplary embodiment, the method employs an existing estimation technique to estimate the selectivity of strings or substrings of given lengths when the selectivity cannot be determined directly from the summary structure. These estimated selectivities are used to select candidate substrings. In one embodiment, a Markov estimator is used. A Markov estimator ME models the selectivity of a unit predicate R.A like % s % as the probability of observing the sequence of all q-grams in $Q_q(s)$ consecutively in R.A values. For example, for q=3 the selectivity associated with % novel % is the probability of observing the sequence $Q_3$(novel)=[nov, ove, vel]. The computation of this probability is simplified by making the Markovian "short memory" assumption, which states that the probability of observing a q-gram in the sequence depends only on the q-gram immediately preceding it, and is independent of all other preceding q-grams. More formally, let % s % be a query predicate. If the q-gram sequence of the string s is $Q_q(s)=[q_1, \ldots, q_k]$, the probability of observing $q_{l+1}$ given $q_1, \ldots, q_k$ under the Markovian assumption is equal to the probability of observing $q_{l+1}$ given $q_l$. Consequently, if $P(q_{l+1}|q_l, \ldots, q_i)$ denotes the probability of observing $q_{l+i}$ immediately after $q_l, \ldots, q_i$ then the selectivity of % s % is computed as:

$$P(q_1) \cdot P(q_2|q_1) \cdot \ldots \cdot P(q_{i+1}|q_1, \ldots, q_i) \cdot \ldots \cdot P(q_n|q_1, \ldots, q_{n-1}) = P(q_1) \cdot P(q_2|q_1) \cdot \ldots \cdot P(q_{i+1}|q_i) \cdot \ldots \cdot P(q_n|q_{n-1})$$

$P(q_i|q_{i-1})$ is the fraction of tuples containing the common substring $cs(q_{i-1}, q_{i-1})$ of $q_{i-1}$ and $q_i$ as well as q. This fraction is computed using $f(q_i)/f(cs(q_{i-1},q_i))$, where $f(cs(q_{i-1},q_i))$ is the frequency of the common substring $cs(q_{i-1},q_i)$. For example, the selectivity of the predicate novel is computed as follows. The 3-gram sequence of "novel" is [nov, ove, vel]. The selectivity of % novel % is then estimated as: $P(nov) \cdot P(ove|nov) \cdot P(vel|ove) = f(nov)/N \cdot f(ove)/f(ov) \cdot f(vel)/f(ve)$, where N is the number of tuples. There is a multiplicative relationship between the selectivities of predicate % s' % and % s %, where s' is a strict substring of s. In other words, the selectivity of % s % is obtained by multiplying the selectivity of % s' % with conditional probabilities of observing the additional q-grams of s in sequence. Consequently, if the selectivities of % s' % and % s % are close, then the ME selectivity estimator of % s % is usually an underestimate. In this disclosure, the selectivity estimated using this Markov estimator is referred to as the ME-Selectivity:

In one embodiment, a q-gram QG estimator is used. The q-gram estimator relies on q-gram frequency tables to derive an upper bound on the selectivity of a unit predicate. The rationale behind this estimator is that the selectivity of a predicate % s % can never exceed that of % s' % for any substring s' of s. In particular, the selectivity of each q-gram of s is an upper bound on the selectivity of % s %. The q-gram estimator returns the minimum selectivity of q-gram of string s as an upper bound on the selectivity of % s %. For the example relation in Table 1, the QG-Selectivity of % novel % is QG(% novel %)=min(f(nov). f(ove), f(vel)}/5=0.2.

TABLE 1

Attribute values and their q-gram sequences

| R.A | Extended q-gram sequences (q = 3) |
|---|---|
| Novel | [#no, nov, ove, vel, el$] |
| Article | [#ar, art, rti, tic, icl, cle, le$] |
| Paper | [#pa, pap, ape, per, er$] |
| Journal | [#jo, jou, our, urn, rna, nal, al$] |
| magazine | [#ma, mag, aga, gaz, azi, zin, ine, ne$] |

Using Short Identifying Substring Would Reduce Underestimation

In one embodiment, the builds upon a hypothesis that most query and attribute string values tend to have "short" substrings whose frequency in the underlying relation is close to the enclosing string. This hypothesis is formalized by defining the notion of a short identifying substring.

A short identifying substring may be identified in the following way. Consider a unit predicate R.A like % s %. A substring s' of s is an $(\epsilon, \beta)$ identifying substring, for $0 \leq \epsilon < 1$ and $0 < \beta < 1$, where $\beta$ denotes the relative selectivities of s and s' and $\epsilon$ denotes the relative lengths of s and s', if:

(i) the selectivity of R.A like % s' % is less than (1+ε) times that of R.A like % s % (i.e., the selectivity of s' is close to the selectivity of s), and (ii) |s'|≦β·s I (i.e., s is longer than s' by at least a factor of 1/β).

For example, if "ove" is a (0, 0.6) identifying substring of the string "novel" for the attribute values in Table 1, the selectivity of % novel % is exactly the same as that of %ove % (hence ε=0), and "ove" is a strict substring of "novel" of length 3≦0.6·5 (hence β=0.6).

Whenever query predicates have short identifying substrings, then the Markov estimator tends to underestimate the true selectivities. If it is likely that the Markov estimator is accurate for a short identifying substring s', then the ME-Selectivity ME(s") of any super-string s" of s' is less than ME(s'). ME(s") is obtained by multiplying ME(s') with additional conditional probability factors. The margin of underestimation grows as β, the ratio of the lengths of the substring and the query string decreases.

The example of Table 2 illustrates the identifying substring hypothesis using a variety of data sets and queries. The following illustrative data sets are used in the example:

(i) organization names column (ON) from a relation consisting of corporate customers, (ii) author names column (AN) of all papers in a database of technical papers, (iii) paper titles column (PT) of all papers in the database of technical papers.

The sizes and the average numbers of tokens (words separated by white space characters) and characters per tuple in all three illustrative data sets are given in the table below. These statistics illustrate the variety in characteristics across data sets. The strings in paper titles column PT are much longer than those in either organizational names column ON or author names column AN.

TABLE 2

Example

| Data set | Size | Average per tuple | |
|---|---|---|---|
| | | #Tokens | #Chars |
| Organization Names (ON) | 13,495 | 3.16 | 25.74 |
| Author Names (AN) | 680,465 | 2.36 | 15.84 |
| Paper Titles (PT) | 313,974 | 8.05 | 63.72 |

For each of these data sets, the method generates query predicates by randomly selecting a word that occurs in any of the tuples. For example, if w is a word in attribute A of a tuple, the method generates a query predicate "A like % w %." Further, the method restricts the choice of words to "popular" words, with frequency of at least some threshold, say 100. The method denotes the set of query predicates obtained from the words in data set x with frequency Y or higher as X_fY. When the frequency threshold is 0 (i.e., when all words are eligible), the method drops the suffix "_f0." In the example, the following query data sets are used:

ON (386 queries),
ANJ100 (1863 queries),
ANJ500 (293 queries),
PTJ100 (2658 queries),
and PTJ500 (667 queries).

In addition, in the example AN-First and AN-Last are also considered, involving queries over the first and last names of authors, respectively.

The following is a validation experiment for this example. Table 3 shows the distribution of the shortest identifying substrings of query tokens when ε is set to ε=0.05, that is, the selectivity of the identifying substring has to be within 5% of the selectivity of the query string. Given this value, the method determines the smallest β value for which the query string has an identifying substring.

The "average length" column in Table 2 is the average number of characters in each query. The next two columns are the average and standard deviation of β values given the ε value. Each of the subsequent columns is marked by a number (3, 4, etc.). A value v in the column marked by a number n indicates that v % of the query strings have a substring of length less than or equal to n whose selectivity is within 5% of the selectivity of the query string.

The mean and standard deviation of β values in Table 2 show that β values may vary across data sets (around 0.6 for ON, around 0.7 for AN, and around 0.6 for P7). Even within the same data set and query workload, the standard deviation of β is high. Further, around 50% to 70% of the queries considered have identifying substrings (when e=0.05) of length less than or equal to 4, and around 70% to 90% of queries have unique substrings of length less than or equal to 5. Therefore, for high frequency query predicates, traditional estimators are likely to return severe underestimates.

TABLE 3

| | | Values of β for ε = 0.05 | | | | | |
|---|---|---|---|---|---|---|---|
| Query Set | Avg. Length | Mean | S.D. | 3 | 4 | 5 | 6 | 7 |
| ON | 7.82 | 0.59 | 0.17 | 21.9 | 64.0 | 91.9 | 98.5 | 99.4 |
| AN-First | 5.84 | 0.74 | 0.10 | 23.7 | 63.5 | 93.0 | 98.4 | 99.5 |
| AN-Last | 6.19 | 0.72 | 0.12 | 22.4 | 58.3 | 90.3 | 98.5 | 99.7 |
| AN_f100 | 6.11 | 0.72 | 0.11 | 22.3 | 60.1 | 91.2 | 98.4 | 99.5 |
| AN_f500 | 5.71 | 0.72 | 0.11 | 29.3 | 73.1 | 95.0 | 98.7 | 99.9 |
| PT_f100 | 8.23 | 0.63 | 0.15 | 17.7 | 48.5 | 73.3 | 86.6 | 92.6 |
| PT_f500 | 8.08 | 0.60 | 0.15 | 19.0 | 57.4 | 78.8 | 87.9 | 95.2 |

Exemplary Estimation Algorithms

Exemplary algorithms for estimating selectivities of string predicates are set forth here. A supporting summary structure like a q-gram table $QT_q(R.A)$ for an attribute R.A are used in the exemplary embodiment. The construction of these supporting structures is disclosed below. This section of the disclosure discusses estimation algorithms for unit predicates of the form R.A like % s %. Later in this disclosure, the discussion extends the estimation algorithms to cover general wildcard predicates, as well as range predicates.

The rationale for the exemplary technique for estimating selectivity of string predicates expands the short identifying substring hypothesis. It would be desirable to correctly guess a "minimal" identifying substring of a query string s. An example of a minimum identifying substring might be the substring "eatt" for the string "seattle." An identifying substring of s is minimal if it does not strictly contain another identifying substring of s. If such a minimal identifying substring could be found, the method could use existing estimating techniques (e.g., the Markov estimator) to compute the selectivity associated with just this minimal identifying substring and return its selectivity estimate as the selectivity of the original predicate, thus alleviating the selectivity underestimation problem. For example, the selectivity estimate of R.A like % eatt % can be returned as that of R.A like % seattle %. However, having only limited statistics on frequencies of substrings available makes correctly guessing a minimal identifying substring for a given string predicate is very hard.

Referring to FIGS. 3 and 4, the present method selects 108 multiple candidate identifying substrings, one for each value of substring length between q (length constant of the q-gram table) and the string length |s| in the exemplary embodiment. Exact selectivities of all q-grams are available from the q-gram table $QT_q(R.A)$. Using the q-gram table, the method can precisely determine the best candidate identifying q-length substring, whose selectivity is guaranteed to be at least as high as that of the query string. Therefore, shorter identifying substrings that can only have even higher selectivities cannot be better identifying substrings (i.e., have a lower $\epsilon$) than the best identifying q-gram. Hence, the method does not consider identifying substrings shorter than length q. For each length between q and |s|, the method finds the substring of that length most likely to be an identifying substring. Finally, the method combines 110 the selectivity estimates of the chosen candidate identifying substrings for each length using a combination function. In one embodiment, the combination function is a regression tree model; This general approach requires that the method specify:

(i) how candidate identifying substrings are identified, and (ii) how to define the combination function.

These two issues are discussed below.

Identifying Candidate Substrings

Figure 5:
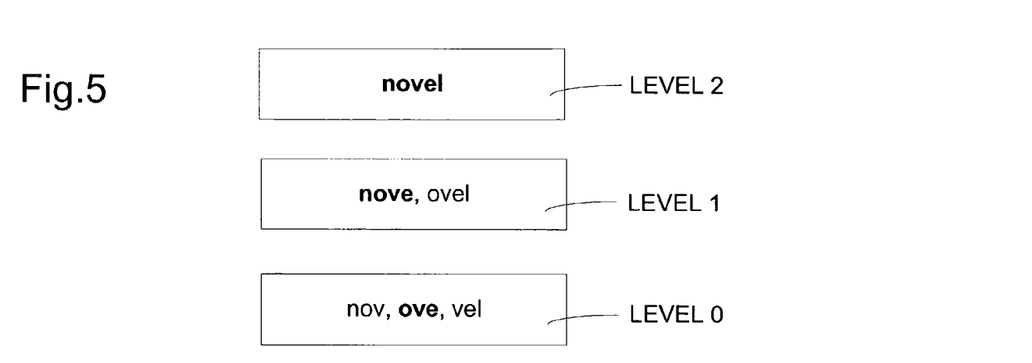
FIG. 5 is an illustration that shows selection of candidate substrings of various lengths.

To estimate the selectivity associated with a string s, the method chooses one potential candidate identifying substring for each length "level" between length q and length |s|. Level 1 consists of all substrings of s of length q+1. For example, FIG. 5 shows the substrings for predicate % novel % organized by level for length q=3. Level 0 includes all substrings of length 3 (e.g., nov). Level 1 has all substrings of length 4 (e.g., nove). Finally level 2 consists only of the string of length 5 (i.e., novel).

At each level, the method focuses on the substring that is most likely to be an identifying substring of the original query string. The selectivity of any substring is no smaller than that of the query string. In the exemplary embodiment, the method chooses the substring at each level with the smallest estimated (or actual at level 0) selectivity. The selectivities of level 0 substrings (i.e., of substrings of length q) can be derived precisely from the q-gram table QT q(R.A) for relation attribute R.A. In the exemplary embodiment, higher levels rely on selectivity estimates when exact frequency statistics for strings longer than q characters are not available. The method can exploit any selectivity estimation technique, such as Markov or QG estimators, that is consistent with the frequency statistics for this task. When the Markov estimator is used the method chooses the substring with the smallest ME Selectivity at each level. For the example, FIG. 5 shows in bold the substring that is picked at each level according to the Markov selectivity estimates if "nove" and "ove" have the smallest selectivities at levels 1 and 0 respectively.

Combining the Candidate Substrings

If the length L of a minimal identifying substring for a query predicate % s % were known, the method could then just estimate the selectivity of the predicate as the estimate for the chosen substring of level L-q. Because this length L is not generally available, the method derives its selectivity estimate for string % s % by combining the selectivity estimate from each length level candidate substring. In the exemplary embodiment, rather than assigning each level some constant or uniform weight in this combination, the method instead learns the level weights from the data sets and expected query workload. The rationale behind this decision is that different data set-query workload combinations result in different average minimal identifying substring lengths. In the exemplary embodiment, the combination function adapts to the data characteristics and the correlations between the query string and substring selectivities. In one embodiment, the method learns the level weights by calculating actual selectivities of substrings of queries from an expected workload and determining estimated selectivities of the substrings of queries from the expected workload. The actual selectivities and estimated selectivities from the workload are compared to learn a function for assigning the level weights.

In one embodiment, a combination function for the level selectivity estimates is learned from a representative training query workload by using a variety of machine learning tools. This disclosure discusses regression trees. However, other combination methods can be employed without deviating from the basic strategy. Referring to FIG. 4, the regression tree is trained in the exemplary embodiment. After training, the regression tree produces the selectivity estimate CRT(s) for a query string % s % from the selectivity values of the candidate substrings at each length level. The regression tree computes CRT(s) as a non-linear combination of the input selectivity values, weighting each level as determined during training.

In the disclosed embodiment, regression tree models are used for modeling dependencies between selectivities of a string and its substrings. The papers Breiman et al., *Classification and regression trees*, Wadsworth, Belmont, Calif., 1984 and Loh, *Regression trees with unbiased variable selection and interaction* detection, Statistica Sinica, 12:361–386, 2002, which are incorporated by reference in there entirety provide a detailed discussion of regression tree models.

A relation R may have numerical attributes $X_1, \ldots, X_m$, Y, of which attribute Y is designated as the dependent attribute, while attributes $X_1, \ldots, X_m$ are the predictor attributes. A regression tree RT on relation R is a tree-structured model for describing the dependent attribute Y in terms of the predictor attributes $X_1, \ldots, X_m$. Each leaf node n in the tree is associated with a function $f_n(X_1, \ldots, X_m)$ that predicts the value of Y given the values of $X_1, \ldots, X_m$. The nature of the function $f_n$ may vary in complexity. For example, possible functions include a constant function, linear combinations of predictor attributes, or a quantile regression function over predictor attributes. Each edge e originating from a non-leaf node n has a predicate p associated with it. For any relation tuple, exactly one of these predicates evaluates to true.

Given a tuple $[x_1, \ldots, X_m, \text{NULL}]$ whose Y value is unknown, the method traverses the regression tree RT starting from its root until a leaf node n is reached by following edges whose associated predicates evaluate to true for the tuple. At the leaf node n, $fn(X_1, \ldots, X_m)$ is the RT predictor of the Y value for the tuple.

Figure 6:
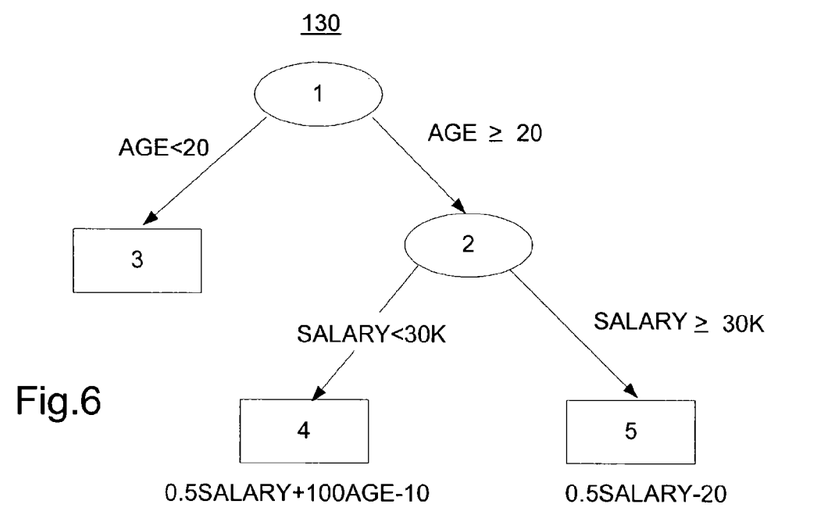
FIG. 6 is an illustration of an example of a regression tree.

FIG. 6 shows an example of a regression tree 130 constructed from a relation with three attributes, Age, Salary, Expenditure, where Age and Salary are the predictor attributes, and Expenditure is the dependent attribute. The illustrated regression tree is used to predict expenditure. The input tuple [21, 30K, NULL] is "routed" to leaf node 4, so the predicted expenditure is O.5·30K+100·21−10=17,090.

For the selectivity estimation problem, the disclosed method attempts to minimize the amount of space required to store the q-gram tables and other auxiliary structures.

Hence, smaller regression trees are preferred. The paper Chaudhuri et al., *Nonparametric estimation of conditional quantities using quantile regression trees*, Bernoulli, 8:561–576, 2002 discloses that quantile regression trees (i.e., regression trees that employ quantile regression functions at leaf nodes) tend to be smaller in size and more accurate than other types of regression trees. Quantile regression models the quantile distribution of the dependent attribute with respect to the predictor attributes. In one embodiment, quantile regression trees are used in the disclosed estimation framework. Other models can be used without changing the general strategy.

A regression tree takes as input a fixed number of predictor attribute values and returns an estimate value for the dependent attribute. In the exemplary embodiment, selectivity estimates are input to the regression tree. The number of selectivity estimates that are passed as input to the regression tree depends on the length of the query string. To handle this variability in input size, the regression tree estimation module is "wrapped" to accept a variable-sized estimate sequence. During training, the number of predictor values that the tree will expect as the average length of the estimate sequences for the training queries is fixed. Then, the regression tree "wrapper" pads shorter estimate sequences with 0's, while it "shrinks" longer estimate sequences by collapsing the selectivity estimates for the largest "levels." For example, the maximum selectivity estimate may be taken for the largest levels.

Figure 7:
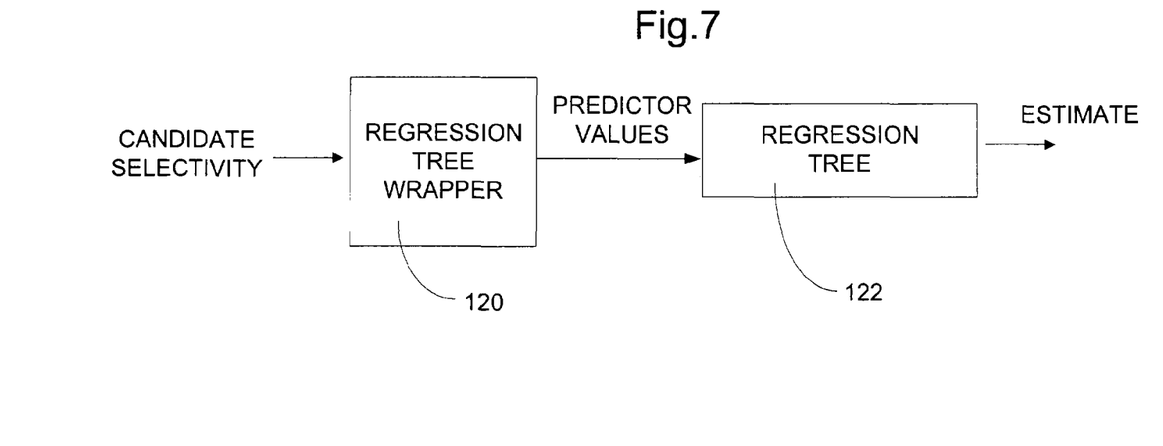
FIG. 7 is a flow chart that illustrates combining of candidate substrings to estimate selectivity of a given string.

FIG. 7 summarizes the selectivity estimation process. Candidate selectivity estimates are provided to the regression tree wrapper 120. The regression tree wrapper provides predictor values to the regression tree 122. Using the predictor values as input, the regression tree provides a selectivity estimate for the string predicate.

Figure 8:
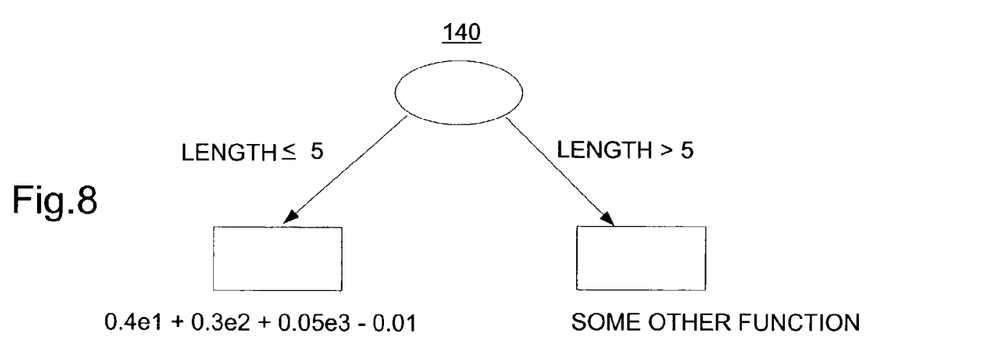
FIG. 8 is an illustration of an example of a regression tree.

As an example, consider the regression tree 140 combination in FIG. 8 and the query predicate % novel %. In the example, the three chosen candidate identifying substrings for this query are ove, nove, and novel. The final selectivity estimate for the query using the regression tree in FIG. 8 is 0.4·SelectivityEstimate(% ove %)+0.3·SelectivityEstimate(% nove %)+0.05·SelectivityEstimate(% novel %)−0.01, because the length of the original query string (i.e., "novel") is 5.

The regression trees introduce some overhead in the selectivity estimation process. The method needs to learn the combination model from a training set of representative example queries. The cost of actually traversing the regression trees while estimating selectivities at run time is negligible, since the regression trees tend to be shallow.

Extending Estimation Algorithms to Other Predicate Types

To this point, this disclosure has focused on unit predicates. Estimation of the selectivity of a more general class of wildcard predicates, as well as of range queries is discussed below. A predicate of the form "R.A between $s_1$[%] and $s_2$[%]", where $s_1$ and $s_2$ do not contain the wildcard character '%', is called a range predicate. A range predicate "between $s_1$% and $s_2$% can be expressed as the sum of several prefix predicates, one for each string between $s_1$ and $s_2$ in lexicographic order. These prefix predicates can be collapsed to a relatively small number of prefix predicates. The selectivity of many of these prefix predicates can be answered exactly from the q-gram table. Consider as an example the range predicate "between abcz % and daab %." The method can estimate the selectivity of this predicate as the sum of the selectivities of the disjoint prefix predicates abcz %, abd %, . . . , abz %, ac %, . . . , az %, b %, c %, daaa %. In this example the method collapses all strings starting with "abd" into the predicate "abd %", whose selectivity can be derived precisely from the frequency of the "abd" 3-gram.

As a variation, when the method processes a range predicate "between $s_1$% and $s_2$%" the method can simply ignore all longer prefix predicates between $s_1$% and $s_2$% whose exact selectivity cannot be derived from the q-gram table. By eliminating these predicates from consideration, which correspond to the ends of the query range, the method introduces less noise in the estimation process. In this disclosure, the resulting estimator for range predicates is referred to as RG-...APPX.

A predicate of the form "R.A like [%]$s_1$% . . . % $s_2$[%]", where $s_1, \ldots, s_k$ do not contain the wildcard character '%', is called a multi-unit predicate. The extension to multi-unit predicates is similar to the q-gram estimator. The selectivity of each predicate % $s_i$% is an upper bound on that of the original query predicate. The method exploits this observation and returns the minimum of all the % $s_i$% selectivity estimates as the estimated selectivity for % $s_1$ % . . . % $s_k$%.

Supporting Structures

In one embodiment, structure used to identify candidate substrings and combine the candidate substrings are q-gram tables and regression trees respectively. A q-gram table QT q(R.A) for a relation attribute R.A stores the frequency in relation attribute R.A of each string of at most q characters from $\Sigma \cup \{\$, \#\}$. The disclosed method can construct a q-gram table QTq(R.A) from a single scan of relation R. For example, the q-gram table can be constructed by processing the output of query "select R.A from R". If $C=|\cup\{\$, \#\}|$, the q-gram table conceptually approximately consists of $QL=C+C^2+ \ldots +C^q=(C^{q+1}-1)/(C-1)$ (not necessarily non-zero) entries. The number QL of entries is actually lower than the approximate expression above, since the special characters # and $ are restricted to only occur at the beginning and at the end of the n-grams, respectively. Therefore, QTq(R.A) stores at most QL frequencies. These entries can be structured using hash tables to store the non-zero frequencies. Alternatively, the method can use a dense representation in an array to avoid storing the actual n-grams. In this case, the frequencies are ordered lexicographically according to their corresponding n-grams, so that the entry associated with a given n-gram can be readily identified with a simple calculation.

To further reduce the size of the q-gram table, the method may maintain only the selectivity of "important" n-grams, while assuming a default (average) frequency for the remaining ones. Existing methods that may be adapted for this are disclosed in the Aboulnaga paper and the Lim et al. paper. The notion of "importance" of an n-gram may be tied to its selectivity. The higher the selectivity, the more important the q-gram. This notion may be further adapted to estimating selectivity of string predicates, so that n-grams are weighted according to their usefulness for deriving accurate selectivity estimates for a specific query workload.

To build a regression tree for a relation attribute, the method uses a training set consisting of a representative query workload of string predicates. Such a training set is typically easy to obtain. For example, such a training set may be obtained from a trace collected by the profiler tool available with most commercial database systems. Given a training set, the method can then use standard regression tree construction algorithms such as the GUIDE algorithm disclosed in the Loh paper or as disclosed in the Chaudhuri paper.

To prepare the training set, the method computes the exact selectivity of all query predicates in the training workload by scanning the relation once. In one embodiment, this selectivity computation is done at the same time as the q-gram table computation. Then, for each query predicate the method prepares an entry in the training set.

The following example illustrates how query string characteristics are represented in a training set. FIG. 8 shows a regression tree 140 for a hypothetical scenario in which he dependence between the selectivity of substrings and the query predicate is different for query strings of length less than or equal to 5 than it is for query strings of length greater than 5. The regression tree illustrated by FIG. 8 is able to model this by associating different combination functions to different leaf nodes, and splitting on the length of the query string. One of the predictor values that is associated with query predicates is then the length of the associated query string.

The following discussion illustrates how query substring selectivity estimates are represented in a training set. The disclosed method chooses one substring per length "level," and computes the associated selectivity estimates, which are ME-Selectivity estimates in one embodiment. The method includes these estimates, one per level, as additional predictor values associated with each query string. Rather than using just the raw estimates, the exemplary method transforms them by taking their logarithm. This way, the non-linear dependence between these substring estimates can be more effectively captured by the linear combination functions used at the leaf nodes of the regression tree. Recall that the ME-Selectivity of a string s is obtained by multiplying the ME-Selectivity of a smaller substring s' with the conditional probability that a value contains s given that it contains s'.

In the exemplary embodiment, the space overhead introduced by using regression trees is negligible. Each non-leaf node of the tree needs to encode the predicates associated with its outgoing edges. In particular, quantile regression trees as well as other typical classes of regression trees are binary. That is, each internal node has only two outgoing edges. Therefore, just two numbers, an integer for the attribute identifier and a real number for the attribute split value, need to be maintained for the method's setting. Each leaf node maintains a set of weights defining a linear combination of the predictor values into the query selectivity estimate. Regression trees on various combinations of data sets and query workloads tend to be very shallow, and hence require little space. Relative to the space required by the q-gram tables, the additional space needed for the regression trees is negligible.

While the present invention has been described with a degree of particularity, it is the intent that the invention include all modifications and alterations falling within the spirit or scope of the appended claims.

The invention claimed is:

1. A method of estimating selectivity of a given string predicate of length n in a database query, comprising:
    a) estimating selectivities of a plurality of string predicate substrings, the plurality of string predicate substrings including substrings of the given string predicate and having each substring length between q to n, where q<n;
    b) categorizing each of the string predicate substrings based on length;
    c) selecting one candidate substring for each category of substring length based on estimated selectivities of the substrings to obtain a plurality of candidate identifying substrings, each candidate identifying substring in the plurality of identifying substrings having a different length between q and n;
    d) combining the estimated selectivities of each of the candidate substrings in the plurality of identifying substrings; and
    e) generating the combined estimated selectivities of the candidate substrings as the estimated selectivity of the given string predicate.

2. The method of claim 1 further comprising storing selectivity information for the database and using stored selectivity information to estimate the selectivities of the substrings of various lengths.

3. The method of claim 1 wherein a substring with a lowest estimated selectivity is selected as the candidate substring at each length.

4. The method of claim 1 further comprising calculating exact selectivities of substrings of a given maximum length and using the exact selectivities to estimate the selectivities of the substrings of various substring lengths.

5. The method of claim 4 wherein a range of the various substring lengths whose selectivities are estimated is between the given maximum length of the substrings whose selectivities are calculated exactly and the length of the given string predicate.

6. The method of claim 4 wherein the candidate substring for the length equal to the given maximum length of the substrings whose selectivities are calculated exactly is selected based on the exact selectivity of the substring.

7. The method of claim 1 wherein a q-gram table is constructed for substrings of a given maximum length and is accessed to estimate selectivities of substrings of various substring lengths.

8. The method of claim 4 wherein a markov estimator uses the exact selectivities to estimate the selectivities of the substrings of various substring lengths.

9. The method of claim 1 wherein characteristics of string values in a relation of the database are used to combine the estimated selectivities of the candidate substrings.

10. The method of claim 1 wherein characteristics of a workload of queries are used to combine the estimated selectivities of the candidate substrings.

11. The method of claim 1 wherein a model for combining the estimated selectivities of candidate substrings is learned from query workloads.

12. The method of claim 1 wherein said model is applied to the candidate substrings at run time to estimate the string predicate selectivity.

13. The method of claim 1 wherein the given string predicate is a unit predicate.

14. The method of claim 1 wherein the given string predicate includes a wildcard character.

15. The method of claim 1 wherein the given string predicate is a range predicates.

16. The method of claim 1 wherein weights are assigned to each length of candidate substring to combine the selectivities of the candidate substrings.

17. The method of claim 16 wherein a function for assigning said weights is learned from data sets of the database.

18. The method of claim 16 wherein a function for assigning said weights is learned from an expected query workload.

19. The method of claim 16 further comprising calculating actual selectivities of substrings of queries from an expected workload and determining estimated selectivities of the substrings of a queries from the expected workload to learn a function for assigning said weights.

20. The method of claim 16 further comprising calculating for a string predicate of a query from an expected workload an actual selectivity of a candidate substring having the given length, determining for the string predicate of the query from the expected workload an estimated selectivity of the candidate substring having the given length, and assigning a weight to candidate substrings of a given length by based on a relationship between the calculated actual selectivity and the determined estimated selectivity.

21. The method of claim 1 wherein selectivities of the candidate substrings are combined using regression trees.

22. The method of claim 20 wherein said regression trees are learned from data sets of the database.

23. The method of claim 20 wherein said regression trees are learned from an expected query workload.

24. A computer readable storage medium having computer executable instructions stored thereon for performing a method of estimating selectivity of a given string predicate of length n in a database query, the method comprising:
  a) estimating selectivities of a plurality of substrings, the plurality of string predicate substrings including substrings of the given string predicate and having each substring length between q to n, where q<n;
  b) categorizing each of the string predicate substrings based on length;
  c) selecting one candidate substring for each category of substring length based on estimated selectivities of the substrings to obtain a plurality of candidate identifying substrings, each candidate identifying substring in the plurality of identifying substrings having a different length between q and n;
  d) combining the estimated selectivities of each of the candidate substrings in the plurality of identifying substrings; and
  e) generating the combined estimated selectivities of the candidate substrings as the estimated selectivity of the given string predicate.

25. The computer readable storage medium of claim 24 wherein the method further comprises storing selectivity information for the database and using stored selectivity information to estimate the selectivities of the substrings of various lengths.

26. The computer readable storage medium of claim 24 wherein a substring with a lowest estimated selectivity is selected as the candidate substring at each length.

27. The computer readable storage medium of claim 24 wherein the method further comprises calculating exact selectivities of substrings of a given maximum length and using the exact selectivities to estimate the selectivities of the substrings of various substring lengths.

28. The computer readable storage medium of claim 27 wherein a range of the various substring lengths whose selectivities are estimated is between the given maximum length of the substrings whose selectivites are calculated exactly and the length of the given string predicate.

29. The computer readable storage medium of claim 27 wherein the candidate substring for the length equal to the given maximum length of the substrings whose selectivities are calculated exactly is selected based on the exact selectivity of the substring.

30. The computer readable storage medium of claim 24 wherein a q-gram table is constructed for substrings of a given maximum length and is accessed to estimate selectivities of substrings of various substrings lengths.

31. The computer readable storage medium of claim 28 wherein a markov estimator uses the exact selectivities to estimate the selectivities of the substrings of various substring lengths.

32. The computer readable storage medium of claim 24 wherein characteristics of string values in a relation of the database are used to combine the estimated selectivities of the candidate substrings.

33. The computer readable storage medium of claim 24 wherein characteristics of a workload of queries are used to combine the estimated selectivities of the candidate substrings.

34. The computer readable storage medium of claim 24 wherein a model for combining the estimated selectivities of candidate substrings is learned from query workloads.

35. The computer readable storage medium of claim 24 wherein said model is applied to the candidate substrings at run time to estimate the string predicate selectivity.

36. The computer readable storage medium of claim 24 wherein the given string predicate is a unit predicate.

37. The computer readable storage medium of claim 24 wherein the given string predicate includes a wildcard character.

38. The computer readable storage medium of claim 24 wherein the given string predicate is a range predicates.

39. The computer readable storage medium of claim 24 wherein weights are assigned to each length of candidate substring to combine the selectivities of the candidate substrings.

40. The computer readable storage medium of claim 39 wherein a function for assigning said weights is learned from data sets of the database.

41. The computer readable storage medium of claim 39 wherein a function for assigning said weights is learned from an expected query workload.

42. The computer readable storage medium of claim 39 wherein the method further comprises calculating actual selectivities of substrings of queries from an expected workload and determining estimated selectivities of the substrings of a queries from the expected workload to learn a function for assigning said weights.

43. The computer readable storage medium of claim 39 wherein the method further comprises calculating for a string predicate of a query from an expected workload an actual selectivity of a candidate substring having the given length, determining for the string predicate of the query from the expected workload an estimated selectivity of the candidate substring having the given length, and assigning a weight to candidate substrings of a given length by based on a relationship between the calculated actual selectivity and the determined estimated selectivity.

44. The computer readable storage medium of claim 24 wherein selectivities of the candidate substrings are combined using regression trees.

45. The computer readable storage medium of claim 44 wherein said regression trees are learned from data sets of the database.

46. The computer readable storage medium of claim 44 wherein said regression trees are learned from an expected query workload.

* * * * *